United States Patent [19]

Ito

[11] 4,021,104

[45] May 3, 1977

[54] FILM-FEEDING SPEED CONTROLLING DEVICE FOR SOUND-CINECAMERA

[75] Inventor: Isami Ito, Suwa, Japan

[73] Assignee: Chinon Industries Incorporation, Suwa, Japan

[22] Filed: Nov. 10, 1975

[21] Appl. No.: 630,286

[30] Foreign Application Priority Data

Nov. 20, 1974 Japan .............................. 49-133803

[52] U.S. Cl. .................................. 352/14; 226/44; 226/45
[51] Int. Cl.² ....................................... G03B 31/00
[58] Field of Search .................. 352/14; 226/44, 45

[56] References Cited
UNITED STATES PATENTS 2,982,172  5/1961  Berkenhoff .......................... 352/14

Primary Examiner—Monroe H. Hayes
Attorney, Agent, or Firm—Woodhams, Blanchard and Flynn

[57] ABSTRACT

A sound-cinecamera comprising a motor for driving a capstan at uniform velocity, a motor for feeding a film intermittently, a detecting switch for detecting any superfluity or insufficiency of the film feed by said film-feeding motor relative to the film feed by said capstan driving motor and generating corresponding sag-signals, a speed-controlling circuit connected to said film-feeding motor and comprising a tachometer generator for maintaining the stability of the speed of said motor, and a sag-detecting circuit comprising said detecting switch, said sag-detecting circuit being connected to the power source of said film-feeding motor and the output thereof is connected to the controlling means of said speed-controlling circuit through a delay circuit, whereby said sag-signals generated by said detecting switch are transmitted to said controlling means independently of said speed-controlling circuit for regularizing fluctuations in the number of revolution of said film-feeding motor arising from fluctuations in voltage of said power source of the film-feeding motor and fluctuations in load of the film.

4 Claims, 5 Drawing Figures

REGULATED D.C. POWER SUPPLY

26 PRIOR ART 4,021,104

FILM-FEEDING SPEED CONTROLLING DEVICE FOR SOUND-CINECAMERA

BACKGROUND OF THE INVENTION

The present invention relates to a film-feeding speed controlling device to be applied to a sound-cinecamera.

A typical one of the conventional devices of this kind is as exemplified in FIGS. 1 and 2 of the appended drawings, and therefore hereunder will be given explanation of conventional devices by reference to this example.

As shown FIGS. 1 and 2, this sound-cinecamera is provided with a motor 21 for intermittently feeding the film 25 for the purpose of shooting motion pictures, a capstan driving motor 20 for feeding the film at uniform velocity to record sounds, a detecting switch 22 for detecting any superfluity or insufficiency of the feed of film by said motor 21 relative to the feed of film by said motor 20 and generating corresponding sagsignals, a speed-controlling circuit (a) connected to said motor 21 and comprising a tachometer generator 15 for maintaining the stability of the speed of the motor 21, a delay circuit (c) provided in said speed-controlling circuit (a) and connected to the output side of said tachometer generator 15, and a sagdetecting circuit (b) comprising said detecting switch 22. In this device, the motor 20 is supposed to work steadily at a constant speed, and the motor 21 is supposed to work selectively ether at a high speed or at a low speed as preset, and the detecting switch 22 is in soft contact with the film 25 as shown in FIG. 2.

In FIGS. 1 and 2, the reference numerals 1 and 2 denote the terminals of a power source, 3 through 8 denote resistors, 9 and 10 denote variable resistances, 11 through 14 denote diodes, 16 denotes a smoothing condenser, 17 through 19 denote transistors, 23 denotes a change-over switch, 24 denotes a power supply switch, 26 denotes a pinch roller, 27 denotes a capstan, and 28 denotes a driving mechanism employing the motor 21.

At the time of operating the foregoing device, the motor 21 actuates the driving mechanism 28 which works on the aperture portion of the film for the purpose of image-shooting thereby to feed the film 25 intermittently, and the motor 20 actuates the sound-recording film driving mechanism 26, 27 which works on the film at a position preceding said driving mechanism 28 by a fixed number of frames thereby to feed the film 25 continueously.

On this occasion, in the case where the motor 21 is running at a high speed, for instance, and the film 25 is excessively fed to cause a sag of film, the detecting switch 22 is turned off and variable resistance 10 is connected, whereby the voltage of the motor 21 is reduced and its rotation is switched over a low speed.

When there occur fluctuations in voltage of the power source for the motor 21 or fluctuations in the load at the time of operation, the output of the tachometer generator 15 in the controlling circuit (a) constituting a servo-system fluctuates and the thus fluctuated output is rectified by the diode 12 and controls voltage to be applied to the motor 21 via the transistors 17, 18 and 19 through the delay circuit (c) consisting of the resistor 5 and the condenser 16, whereby the speed of the motor 21 can be stably maintained.

In order to maintain the speed of the motor 21 stably as above, it is necessary to reduce the inertia of revolution of the motor 21 as far as possible and to secure the gain for the controlling circuit (a).

For this purpose, it will do to enlarge the difference between the high speed and low speed of the motor 21 and set the feed of film 25 to be, for instance, 10 (feet per second) at the time of the low speed and 26 F/S at the time of the high speed, while actuating the detecting switch 22 for synchronization at 18 F/S.

However, in the case where the difference between the high speed and low speed of the motor 21 is enlarged as above, a damping force arising from actuation of the detecting switch 22 works on the motor 21 so abruptly that the speed of film 25 fluctuates abruptly and/or irregularly and the time for exposure on the occasion of shooting fluctuates, entailing occurrence of undesirable phenomena such as the flickering of image at the time of projection.

Inasmuch as the conventional sound-cinecameras are of such a construction as exemplified above, they have been defective in that an attempt to maintain the controlling efficiency of the servo-system thereof would render it impossible to prevent the occurrence of the flickering of image while an attempt to prevent the occurrence of the flickering of image would render it difficult to maintain the controlling efficiency of said servo-system.

SUMMARY OF THE INVENTION

Principal object of the present invention is to provide a film-feeding speed controlling device for sound-cinecameras which overcomes the afore-mentioned drawbacks of the conventional devices.

Another object of the present invention is to provide a film-feeding speed controlling device for sound-cinecameras, wherein a circuit for detecting the sag of the film being fed is connected to the power source of a motor for feeding the film intermittently, the output end of said sag-detecting circuit is connected to the controlling means of a film-feeding speed controlling circuit through a delay circuit, and sag signals generated by a detecting switch provided in the sagdetecting circuit are to be transmitted to the controlling means of said film-feeding speed controlling circuit through said delay circuit independently of the signal which the tachometer generator controls dependent on the fluctuation in the voltage of said power source and fluctuations in the load of said film-feeding motor, whereby said sag-detecting circuit can be imparted with time constant without deteriorating the controlling efficiency of said controlling circuit.

A further object of the present invention is to provide a film-feeding speed controlling device for sound-cinecameras, wherein said sag-detecting circuit is imparted with a time constant, whereby the time necessary for change-over of the speed of the film-feeding motor is prolonged, an abrupt change in the film-feeding speed is avoided, and accordingly the occurrence of the phenomenon of the projected image flickering due to fluctuations in the time for exposure on the occasion of shooting can be controlled so as not to be visually sensed.

A still further object of the present invention is to provide a film-feeding speed controlling device for sound-cinecamera, wherein said sag-detecting circuit is imparted with a time constant, thereby rendering it possible to secure the gain for said speed-controlling circuit and accordingly to maintain the controlling efficiency thereof stably even when sag-signals are frequently generated by the sag-detecting switch.

DETAILED DESCRIPTION OF THE INVENTION

Figure 3:
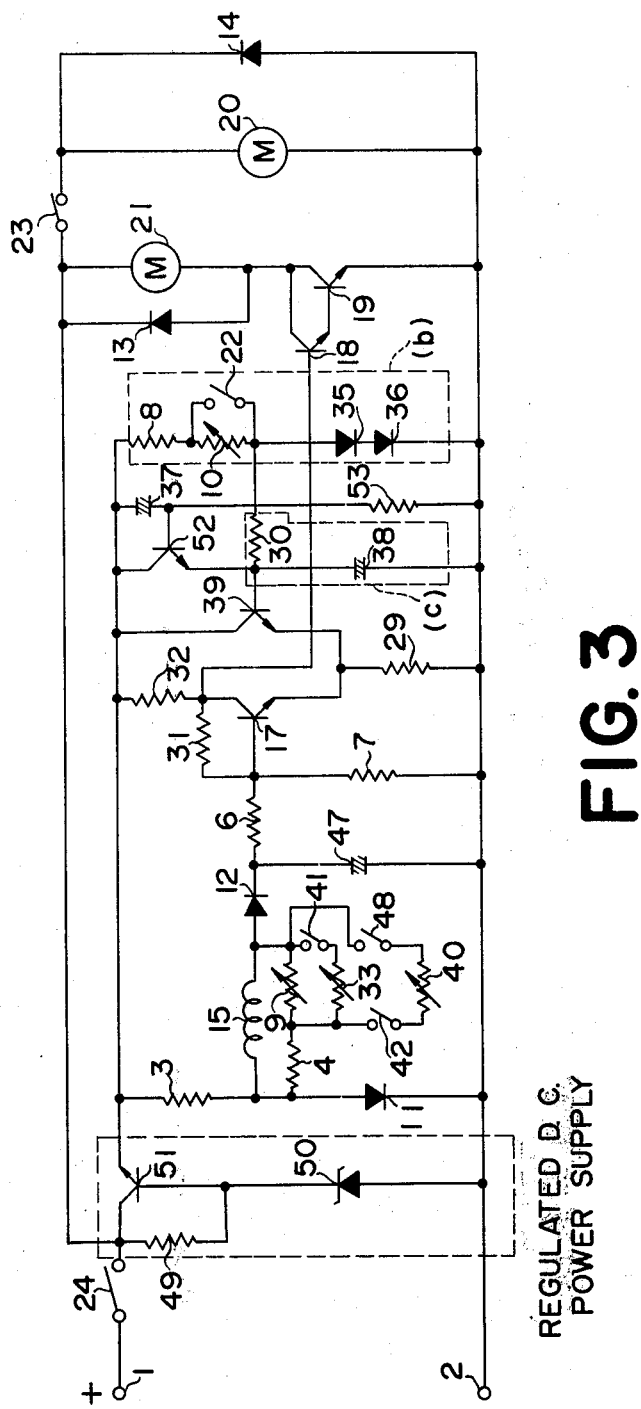
FIG. 3 is a drawing illustrative of the first embodiment of the electric circuit for the film-feeding speed controlling device of a sound-cinecamera according to the present invention.
Figure 4:
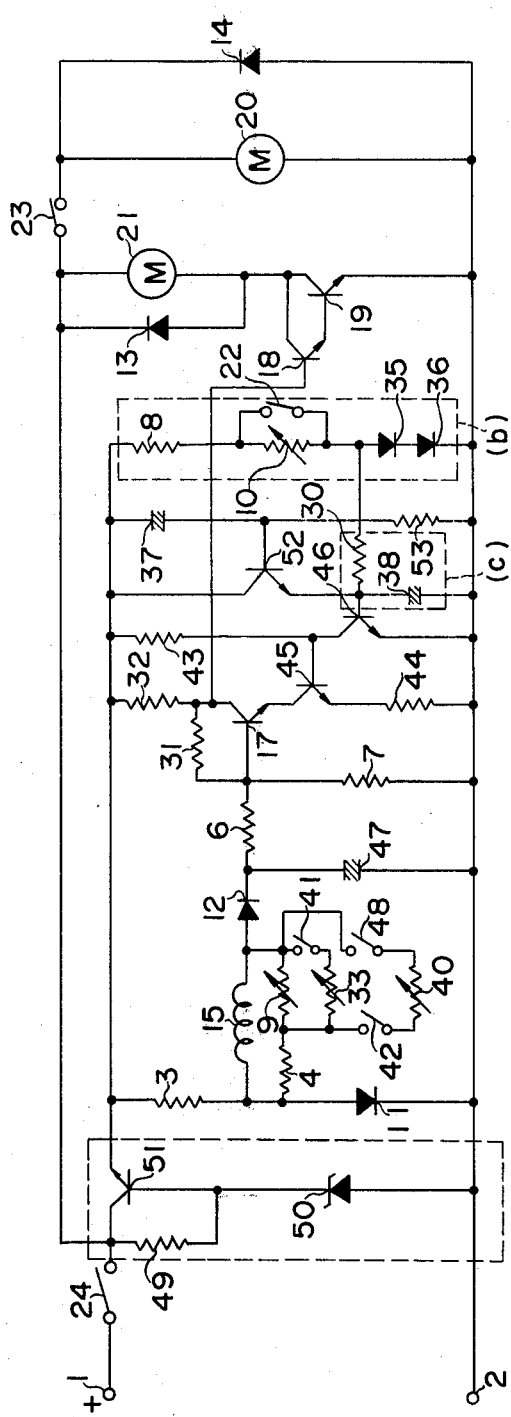
FIG. 4 is a drawing illustrative of the second embodiment of the electric circuit for the film-feeding speed controlling device of a sound-cinecamera according to the present invention.

In FIGS. 3 and 4 are shown respectively the first and second embodiments of the present invention. Hereunder will be explained mainly the difference between the aforesaid conventional device and these embodiments of the present invention while expressing the parts in common by identical symbols thereby to dispense with redundant explanation as far as possible.

In FIGS. 3 and 4, the reference numerals 29 through 32 denote resistors, 33 denotes a variable resistance, 35 and 36 denote diodes, 37 and 38 denote condensers, 39 denotes a transistor, 41 denotes a switch, 43 and 44 denote resistors, 45 and 46 denote transistors, and 47 denotes a condenser.

Figure 1:
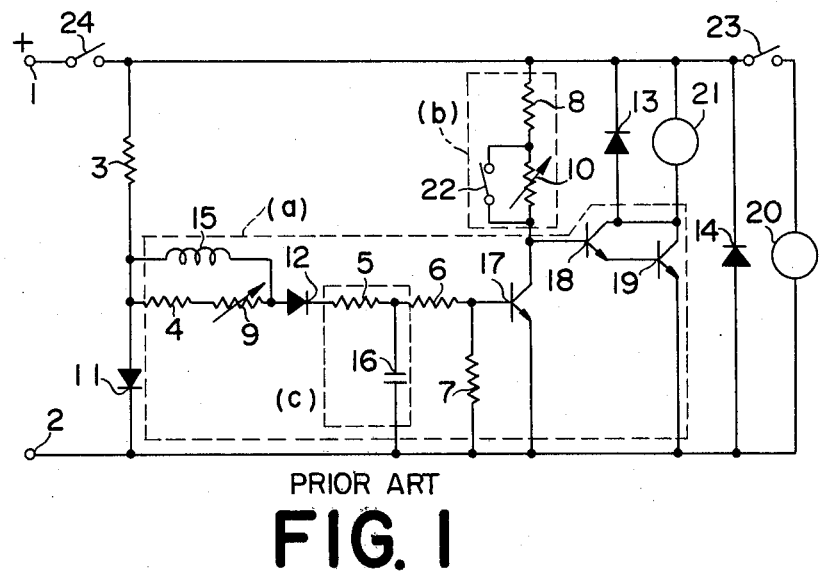
FIG. 1 is a drawing illustrative of the electric circuit for the film-feeding speed controlling device of a typical conventional sound-cinecamera.
Figure 2:
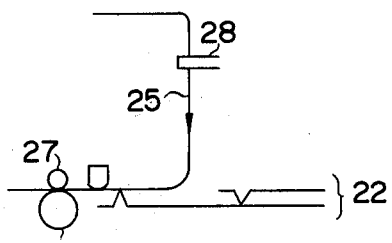
FIG. 2 is a drawing illustrative of the sag-detecting means of the same device as in FIG. 1.

A remarkable difference between these embodiments and the conventional device shown in FIG. 1 lies in that the delay circuit (c) consisting of the resistor 30 and condenser 38 does not constitute a part of the controlling circuit but is connected to the other controlling transistor 39. In this connection, in the case of the conventional device shown in FIG. 1, the delay circuit (c) consisting of the resistor 5 and condenser 16 constitutes a part of the controlling circuit (a) and is connected to the output side of the tachometer generator 15.

Inasmuch as the device shown in FIGS. 3 and 4 are of such a constitution as above, the emitter voltage of the controlling transistor 17 comes to change with time delay at the time when the detecting switch 22 actuates. For instance, when the film 25 sags and the detecting switch 22 detects this sag, said switch 22 opens and the emitter potential of the transistor 17 lowers and the output of the tachometer generator 15 apparently increases, whereby the voltage of motor 21 as the collector voltage of the transistor 18 and 19 decreases with the reduction of base current thereof, resulting in reduction of speed of the motor 21. At this, as the delay circuit (c) consisting of the resistor 30 and condenser 38 is not in connection with the output side of the tachometer generator 15 as stated above, there occurs no delay in output of the tachometer generator 15, and the control of the number of revolutions by the action of the detecting switch 22 and the control of the number of revolutions arising from the fluctuation in load and the fluctuation in voltage of the power source are dissociated. The condenser 37, transistor 52 and resistor 53 are for the purpose of starting compensation at the time of closing the power-source switch 24.

The devices shown in FIGS. 3 and 4 are also servable for shooting silent film in addition to the foregoing use, and are provided with a supplementary circuit to serve for this purpose. Hereunder will be explained said supplementary circuit.

The switches 23, 41 and 48 serve for selecting the silent-film shooting and the sound-film shooting: at the time of the silent-film shooting, the switches 23 and 41 are opened, and the film-feeding speed 18 F/S at the time of the silent-film shooting is adjusted by controlling with the variable resistance 9, while at the time of the sound-film shooting, as the switch 23 closes, the motor 20 is connected to the controlling circuit, and at the same time, the switch 41 closes, whereby the parallel variable resistance 33 is connected to the controlling circuit. Under this condition, by closing the detecting switch 22 and adjusting the parallel variable resistance 33 of the tachometer generator 15, the aforesaid high speed 26 F/S is set. And then, by opening the detecting switch 22, adjustment of the foregoing low speed is performed by means of the variable resistance 10 of the base curcuit of the transistor 39 for effecting the delay.

In this way, the circuits in the present embodiments render it possible to perform both the shooting of silent film and the sound-recording shooting of sound film at the reference speed 18 F/S.

Moreover, the semi-fixed resistance 40 and the high speed switch 42 of the base circuit of the controlling transistor 17 permits shooting at a high speed, such as 48 F/S, at the time of the silent-film shooting. On this occasion, when the switch 48 for use in the silent-film shooting is closed, the base current of the controlling transistor 17 decreases and the emitter current also decreases for the switch 42 is being closed, and accordingly, the collector current of the transistors 18 and 19 increases and the motor 21 shifts to the high speed.

The diodes 35 and 36 of the base circuit of the transistor 39 for effecting the delay are constructed as a constantvoltage element employing forward voltage characteristic of diode, and generate two reference voltages depending on the working of the resistors 8 and 10 for forward bias and the detecting switch 22.

The embodiment shown in FIG. 4 differs in the construction of the circuits thereof from that of the embodiment shown in FIG. 3 in connection with resistors 43 and 44 and the transistors 45 and 46. However, the mode of use thereof is quite the same as that of the embodiment in FIG. 3 and therefore explanation of details thereof is omitted herein.

Figure 5:
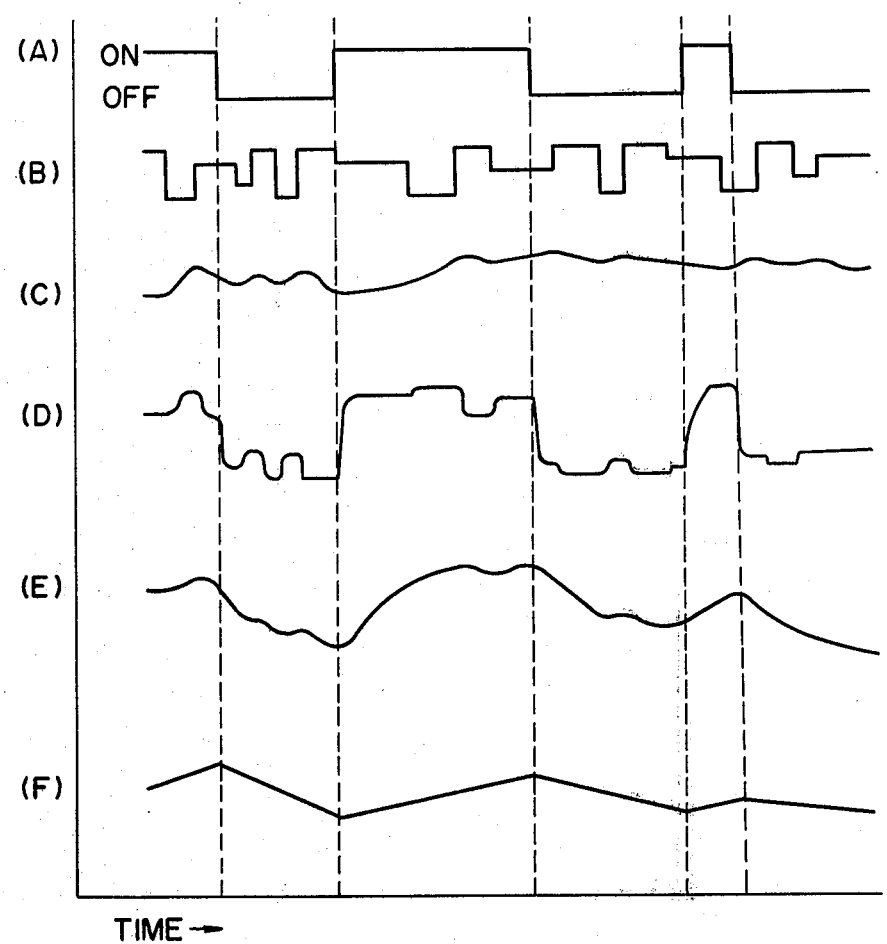
FIG. 5 is a drawing illustrative of various wave forms.

In FIG. 5, there are shown the fluctuations in sag of the film in the case where the film is being fed at a prescribed speed and the detecting switch is on and in the case where the film sags as a result of its being fed at a speed higher than said prescribed speed and the detecting switch is off (A), the fluctuations in load of the motor (B), and the fluctuations in voltage of the power source (C). FIG. 5 also shows the speed characteristics of the film-feeding motor in the case where the delay circuit is not provided (D), the case where the delay circuit is provided within the controlling circuit (to wit, the case shown in FIG. 1; E) and the case where the delay circuit is provided outside the controlling circuit (to wit, the case shown in FIGS. 3 and 4; F) respectively under the conditions illustrated in (A), (B) and (C) in the vertically arranged columns (A), (B), (C), (D), (E) and (F), while time is shown in the transverse direction.

As will be understood from this drawing, in the case of application of a controlling device according to the present invention, the speed of the film-feeding motor can be by far more desirably controlled compared with the conventional controlling devices.

It will also be understood that, according to the present device, as the parts other than the circuit for motor which can be driven with a relatively low voltage would be connected to a separately provided regulated power supply circuit, a further enhancement of efficiency thereof can be expected.

Although particular preferred embodiments of the invention have been disclosed in detail for illustrative purpose, it will be recognized that variations or modifications of the disclosed devices, including the rearrangement of parts, lie within the scope of the present invention.

What is claimed is:

1. A film-feeding speed controlling device for sound-cinecameras comprising a motor for driving a capstan at uniform velocity, a motor for feeding a film intermittently, a detecting switch for detecting any superfluity or insufficiency of the film feed by said film-feeding motor relative to the film feed by said capstan driving motor and generating corresponding sag-signals, a speed-controlling circuit connected to said film-feeding motor and comprising a tachometer generator for maintaining the stability of the speed of said motor, and a sag-detecting circuit comprising said detecting switch, characterized in that said sag-detecting circuit is connected to a regulated power supply and the output thereof is connected to the controlling means of said speed-controlling circuit through a delay circuit, whereby said sag signals generated by said detecting switch are transmitted to said controlling means independently of said speed-controlling circuit for regularlizing fluctuations in the number of revolutions of said film-feeding motor arising from fluctuations in voltage of said power source of the film-feeding motor and fluctuations in load of the film.

2. A film-feeding speed controlling device for sound-cinecameras according to claim 1, wherein said speed-controlling circuit comprises a controlling transistor, said film-feeding motor is connected to the collector circuit of said controlling transistor and also said delay circuit is connected to the emitter circuit of said controlling transistor.

3. A film-feeding speed controlling device for sound-cinecameras according to claim 2, wherein the output end of said delay circuit is connected to the emitter circuit of said controlling transistor through a transistor having its base connected to the output end of said delay circuit and its emitter interconnected with the emitter of said controlling transistor.

4. A film-feeding speed controlling device for sound-cinecameras according to claim 2, wherein the output end of said delay circuit is connected to the emitter circuit of said controlling transistor through a first transistor having its base connected to the output end of said delay circuit and a second transistor having its base connected to the collector of said first transistor and its collector connected to the emitter of said controlling transistor.

* * * * *